United States Patent
Kulkarni et al.

(10) Patent No.: US 11,455,437 B1
(45) Date of Patent: Sep. 27, 2022

(54) TECHNIQUES FOR GENERATING AND RETRIEVING CHANGE SUMMARY DATA AND AGGREGATED MODEL VERSION DATA FOR AN INFRASTRUCTURE MODEL

(71) Applicant: Bentley Systems, Incorporated, Exton, PA (US)

(72) Inventors: Nishad Kulkarni, Placentia, CA (US); Arnob Mallick, Austin, TX (US); Kaustubh Page, Bee Cave, TX (US)

(73) Assignee: Bentley Systems, Incorporated, Exton, PA (US)

( * ) Notice: Subject to any disclaimer, the term of this patent is extended or adjusted under 35 U.S.C. 154(b) by 310 days.

(21) Appl. No.: 16/601,759

(22) Filed: Oct. 15, 2019

(51) Int. Cl.
*G06F 30/13* (2020.01)
*G06F 111/02* (2020.01)
*G06F 16/28* (2019.01)
*G06F 9/451* (2018.01)

(52) U.S. Cl.
CPC ............. *G06F 30/13* (2020.01); *G06F 9/451* (2018.02); *G06F 16/284* (2019.01); *G06F 2111/02* (2020.01)

(58) Field of Classification Search
CPC ........ G06F 30/13; G06F 9/451; G06F 16/284; G06F 2111/02
USPC ............................................................ 703/1
See application file for complete search history.

(56) References Cited

U.S. PATENT DOCUMENTS

| | | | |
|---|---|---|---|
| 5,649,200 A * | 7/1997 | Leblang | G06F 8/71 707/999.202 |
| 5,758,150 A | 5/1998 | Bell | |
| 6,430,455 B1 * | 8/2002 | Rebello | G06F 8/71 703/22 |
| 6,526,418 B1 | 2/2003 | Midgley | |
| 6,839,724 B2 * | 1/2005 | Manchanda | G06F 16/283 707/999.203 |
| 7,395,258 B2 | 7/2008 | Altinel et al. | |
| 7,657,406 B2 | 2/2010 | Tolone et al. | |
| 8,423,951 B1 * | 4/2013 | Koller | G06F 8/10 717/104 |
| 9,998,551 B1 | 6/2018 | Campbell | |
| 10,268,709 B1 * | 4/2019 | Suehs | G06F 16/211 |
| 10,311,167 B1 * | 6/2019 | Unrau | G06F 3/04815 |

(Continued)

*Primary Examiner* — Juan C Ochoa
(74) *Attorney, Agent, or Firm* — Cesari and McKenna, LLP

(57) ABSTRACT

Techniques are provided for generating and retrieving change summary data and aggregated model version data for an infrastructure model. A process obtains a briefcase representing a particular version of the infrastructure model and one or more changesets. The process applies the changeset(s) to the briefcase to construct a briefcase that represents a newer version of the infrastructure model. The process compares the briefcases to generate a change summary indicating modifications between the two versions. Further, the process generates aggregated model version data as the infrastructure model transitions to newer versions. The process updates the aggregated model version data utilizing the change summaries such that the aggregated model version data is comprehensive regarding each element that is and was included in the infrastructure model from its genesis to its current state. A client device issues requests to obtain a particular version of the infrastructure model and/or to obtain modifications between versions.

18 Claims, 12 Drawing Sheets

(56) References Cited

U.S. PATENT DOCUMENTS

| | | | |
|---|---|---|---|
| 10,558,529 B2 | 2/2020 | Mayer et al. | |
| 10,733,057 B2* | 8/2020 | Bentley | G06F 16/2358 |
| 10,970,316 B1* | 4/2021 | Khan | G06F 16/289 |
| 11,226,953 B2* | 1/2022 | Raman | G06F 16/2358 |
| 2005/0262048 A1 | 11/2005 | Dettinger | |
| 2006/0253419 A1 | 11/2006 | Lin | |
| 2007/0192376 A1* | 8/2007 | Bentley | G06F 16/10 |
| 2008/0140732 A1* | 6/2008 | Wilson | G06F 16/1873 |
| 2008/0159527 A1* | 7/2008 | Bentley | G06F 21/6209 |
| | | | 380/28 |
| 2009/0144696 A1 | 6/2009 | Andersen | |
| 2010/0211662 A1 | 8/2010 | Glendinning | |
| 2011/0231161 A1* | 9/2011 | Brown | G06F 30/00 |
| | | | 703/1 |
| 2011/0314138 A1 | 12/2011 | Kobayashi | |
| 2013/0117232 A1* | 5/2013 | Lee | G06F 16/213 |
| | | | 707/639 |
| 2013/0144566 A1* | 6/2013 | De Biswas | G06T 17/005 |
| | | | 703/1 |
| 2015/0007176 A1 | 1/2015 | Kotani | |
| 2019/0108245 A1* | 4/2019 | Bentley | G06F 16/27 |
| 2019/0294722 A1 | 9/2019 | Mohan | |
| 2020/0104103 A1* | 4/2020 | Mair | G06F 8/34 |
| 2020/0117445 A1 | 4/2020 | Wilson et al. | |
| 2020/0117729 A1* | 4/2020 | Raman | G06F 16/2358 |

* cited by examiner

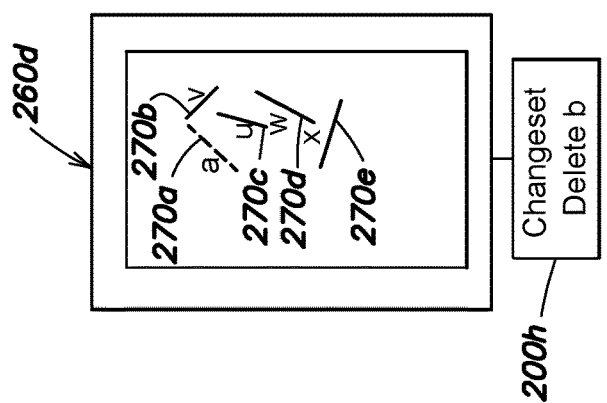
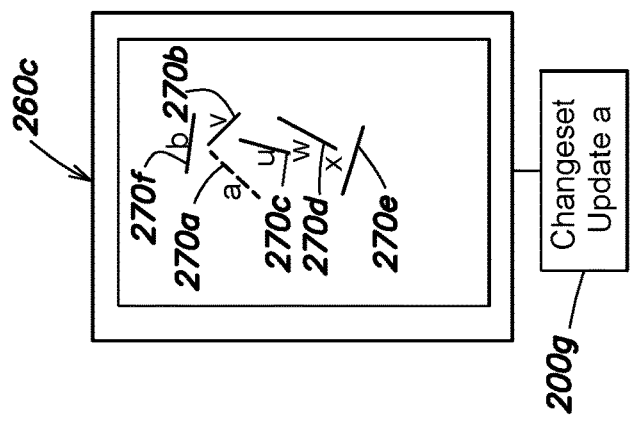
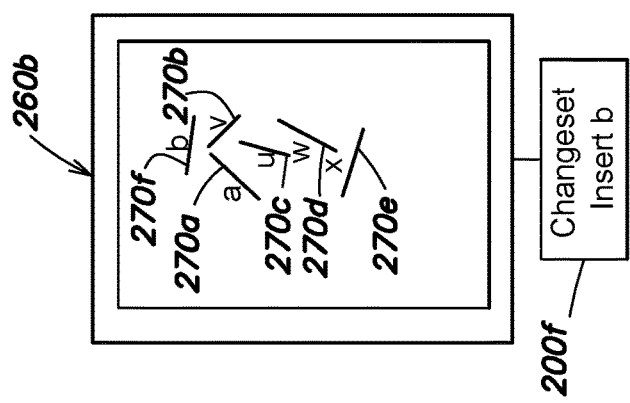
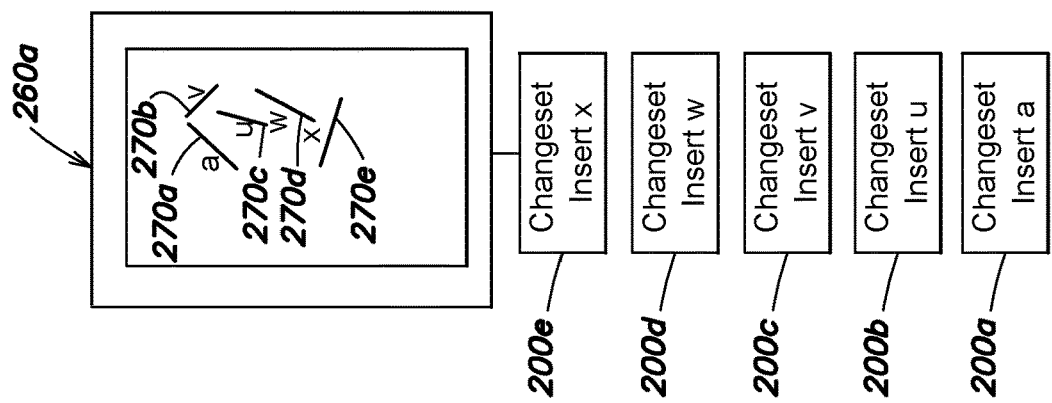

TECHNIQUES FOR GENERATING AND RETRIEVING CHANGE SUMMARY DATA AND AGGREGATED MODEL VERSION DATA FOR AN INFRASTRUCTURE MODEL

BACKGROUND

Technical Field

The present disclosure relates generally to computer-based infrastructure modeling, and more specifically to techniques for generating and retrieving change summary data and aggregated model version data for an infrastructure model.

Background Information

Throughout the design, construction and operation of an infrastructure (e.g., buildings, factories, roads, railways, bridges, electrical and communication networks, etc.) it is often desirable to model the infrastructure using infrastructure modeling software. A local copy of a briefcase, representing the infrastructure, may be maintained and modified at different devices that are individually or collaboratively working on the design, construction and operation of the infrastructure.

Traditionally, a particular client device does not readily and easily have visibility into the changes made to the infrastructure model over time, and the different versions of the infrastructure model created over time. In addition, the changes are not typically organized in such a manner that the client devices can easily and efficiently search the changes and versions to gain a better understanding of the development and modification of the infrastructure model from its genesis to current state.

SUMMARY

Techniques are provided for generating and retrieving change summary data and aggregated model version data for an infrastructure model. A process, executing at a cloud-based software, may obtain a particular briefcase, e.g., a state of a database representing a particular version of the infrastructure model, and one or more changesets. Each changeset may include information associated with one or more changes made to the infrastructure model during a particular time span. The briefcase and each changeset may, for example, be in a format that is consistent with or compatible with a relational database (e.g., SQLite database). The process may apply the one or more changesets to the briefcase to construct a briefcase that represents a newer version of the infrastructure model.

The process may compare, utilizing an application program interface (API), the two briefcases representing different versions (e.g., consecutive versions) of the infrastructure model to generate one or more change summaries. Each change summary may include information indicating the modifications (e.g., insertions, deletions, and updates) between the briefcases representing the two different versions of the infrastructure model. Each change summary may, for example, be in a JavaScript Object Notation (JSON) format, Binary JSON (BSON) format, Extensible Markup Language (XML) format, or a similar format.

In addition, the process may generate aggregated model version data as the infrastructure model transitions to current/newer versions. Specifically, the process may update the aggregated model version data utilizing the generated change summaries such that the aggregated model version data is comprehensive and complete regarding each and every element that is and was included in the infrastructure model from its genesis to its current state. For each element inserted or updated in a version of the infrastructure model, a new entry may be generated for the aggregated model version data. For each element deleted from a particular version of an infrastructure model, the entry for the deleted element may still be maintained within the data aggregated model version data, but the highest value included in a version field of the entry for the deleted element is a value of the particular version of the infrastructure model from which the element was deleted. The aggregated model version data may, for example, be in a JSON format, BSON format, XML format, or a similar format.

A client device may issue one or more requests for the differences between versions of an infrastructure model. In response to the request, a service of the cloud-based software may obtain the one or more change summaries and determine the net change between the versions of the infrastructure model. The service may provide the net change, through a graphical user interface (GUI) or a command line interface (CLI), to the client device. Advantageously, a particular user operating the client device may learn of the overall differences between versions of the infrastructure model over a particular time span.

The client device may also issue one or more requests for a particular version of the infrastructure model. In response to the request, the service may obtain the aggregated model version data and determine which elements include a reference to the particular version requested by the client device. The service may then select the elements and provide the client device, through the GUI or the CLI, with the requested version of the infrastructure model or the elements included in the requested version and the properties of the elements. Advantageously, a user operating the client device may obtain any version of the infrastructure model from its genesis to its current state.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings, of which:

FIGS. 2A-2D are diagrams illustrating example changesets that are associated with different versions of an infrastructure model in accordance with an example embodiment;

DETAILED DESCRIPTION OF AN ILLUSTRATIVE EMBODIMENT

Figure 1:
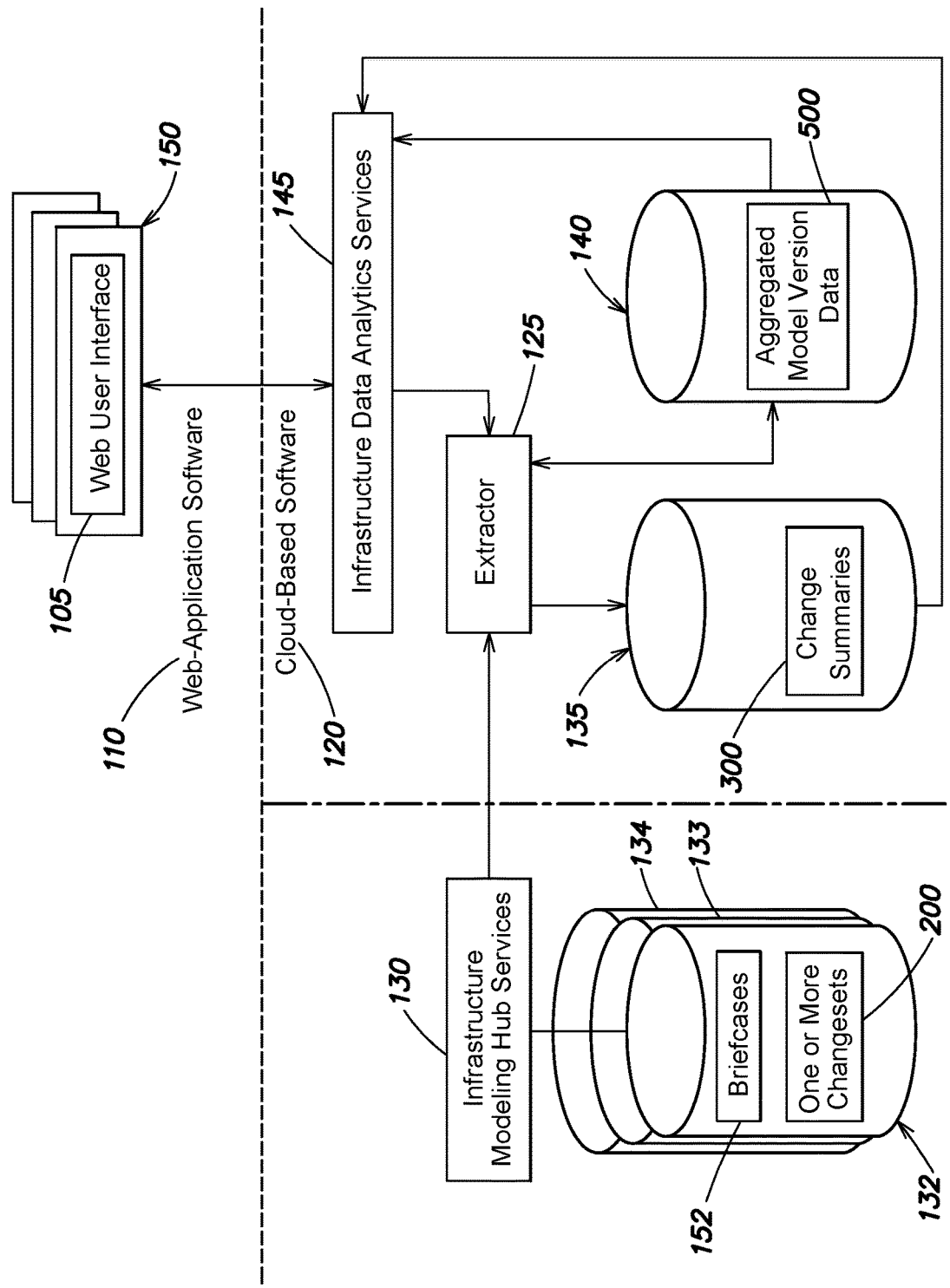
FIG. 1 is a high-level block diagram of at least a portion of an example infrastructure modeling software architecture in accordance with an example embodiment.

FIG. 1 is a high-level block diagram of at least a portion of an example infrastructure modeling software architecture in accordance with an example embodiment. The architecture may be divided into web-application software 110 executing on one more or more computing devices arranged locally on-premises or hosted for an enterprise's use (collectively "client devices"), and cloud-based software 120 that is executed on one or more remote computing devices ("cloud computing devices") accessible to the enterprise, and other enterprises, over the Internet.

The cloud-based software 120 includes infrastructure modeling hub services (e.g., iModelHub services) 130 and repositories 132-134. Repositories 132-134 include at least briefcases 152 and changesets 200. The infrastructure modeling hub services 130, repositories 132-134, briefcases 152, and changesets 200 are described in commonly assigned co-pending U.S. patent application Ser. No. 16/156,824, the contents of which are incorporated by reference in their entirety. The briefcases 152 and changesets 200 may be stored in a format that is consistent or compatible with a relational database (e.g., SQLite database).

The cloud-based software 120 further includes extractor 125 that generates change summaries 300 and aggregated model version data 500 according to the one or more embodiments described herein. The change summaries 300 and aggregated model version data 500 may be stored, respectively, on repository 135 and repository 140 as JavaScript Object Notation (JSON) files, Binary JSON (BSON) files, Extensible Markup Language (XML) files, or in a similar format. For example, the repository 135 and repository 140 may be non-relational databases (e.g. MongoDB, Cassandra, CosmosDB). Although reference is made to the repositories 135 and 140 being separate and distinct, it is expressly contemplated that a single unified repository may store change summaries 300 and aggregated model version data 500.

In addition, cloud-based software 102 includes infrastructure data analytics services 145. Infrastructure data analytics services 145 may utilize the aggregated model version data 500 to provide to client devices 150 data indicating the elements, and their properties, included in a particular version of an infrastructure model according to the one or more embodiments described herein. In addition or alternatively, the infrastructure data analytics services 145 may utilize the change summaries 300 to provide to the client devices 150 data indicating the differences between versions of the infrastructure model according to the one or more embodiments described herein.

The extractor 125 and the infrastructure data analytics services 145 may be hardware, software, or a combination thereof. In addition, although reference is made to the extractor 125 and the infrastructure data analytics services 145 being separate and distinct, it is expressly contemplated that the extractor 125 and the infrastructure data analytics services 145 may be part of a single component that implements the functions of the extractor 125 and the infrastructure data analytics services 145 as described herein.

Client device 150 may be a laptop, a desktop, a mobile computing device, or any other computing device that executes web-application software 110. Specifically, the client device 150 may include a web user interface 105 to communicate with the infrastructure data analytics services 145 via the web-application software 110. The client devices 150, the infrastructure modeling hub services 130, extractor 125, and the infrastructure data analytics services 145 may include processors, memory, storage systems, and other hardware (not shown).

FIGS. 2A-2D are diagrams illustrating example changesets 200 that are associated with different versions of an infrastructure model in accordance with an example embodiment. For simplicity and ease of illustration, elements 270a-270f in FIGS. 2A-2D are simply lines, however it is expressly contemplated that the elements may be more complex elements and represent entities in the real-world (e.g., pumps, beams, contracts, companies, etc.). For simplicity and ease of illustration, changesets 200a-200h only include high level information regarding the modifications made to the versions of the infrastructure models, however it is expressly contemplated that changesets 200a-200h may store the particular information as described in commonly assigned co-pending U.S. patent application Ser. No. 16/156,824, the contents of which are incorporated by reference in their entirety.

FIG. 2A is a diagram illustrating changesets 200a-200e that are associated an initial version 260a of an infrastructure model that may have been created from an "empty" model (version zero). As depicted, the initial model 260a includes element a 270a, element u 270b, element v 270c, element w 270d, and element x 270e. Based on the insertion of these elements into the empty model, changesets 200a-200e may be generated as described in commonly assigned co-pending U.S. patent application Ser. No. 16/156,824, the contents of which are incorporated by reference in their entirety. A briefcase 152, representing the initial version (e.g., version one) of the infrastructure model, and the associated changesets 200a-200e may be stored on a repository of the repositories 132-134. For example, the briefcase 152 and changesets 200a-200e may be stored in a format that is consistent or compatible with a relational database (e.g., SQLite database).

FIG. 2B is a diagram illustrating changeset 200f associated with version two 260b of the infrastructure model. As depicted, element b 270f is inserted into the initial model to create version two 260b of the infrastructure model. Based on the insertion of element b 270f into the initial model 260a, changeset 200f may be generated as described in commonly assigned co-pending U.S. patent application Ser. No. 16/156,824, the contents of which are incorporated by reference in their entirety. A briefcase 152 representing version two 260b of the infrastructure model and the associated changeset 200f may be stored on a repository of the repositories 132-134. For example, the briefcase 152 and changeset 200f may be stored in a format that is consistent or compatible with a relational database (e.g., SQLite database).

FIG. 2C is a diagram illustrating changeset 200g associated with version three 260c of the infrastructure model. As depicted, element a 270a is updated in version two 260b from a solid line to a dashed line to create version three 260c of the infrastructure model. Based on the update to element a 270a, changeset 200g may be generated as described in commonly assigned co-pending U.S. patent application Ser. No. 16/156,824, the contents of which are incorporated by reference in their entirety. A briefcase 152 representing version three 260*c* of the infrastructure model and the associated changeset 200*g* may be stored on a repository of the repositories 132-134. For example, the briefcase 152 and changeset 200*g* may be stored in a format that is consistent or compatible with a relational database (e.g., SQLite database).

FIG. 2D is a diagram illustrating changeset 200*h* associated with version four 260*d* of the infrastructure model. As depicted, element b 270*f* is deleted from version three 260*c* to create version four 260*d* of the infrastructure model. Based on the deletion of elements b 270*f* from version three 260*c*, changeset 200*h* may be generated as described in commonly assigned co-pending U.S. patent application Ser. No. 16/156,824, the contents of which are incorporated by reference in their entirety. A briefcase 152 representing version four 260*d* of the infrastructure model and the associated changeset 200*h* may be stored on a repository of the repositories 132-134. For example, the briefcase 152 and changeset 200*h* may be stored in a format that is consistent or compatible with a relational database (e.g., SQLite database).

Changesets 200 may be linked to a briefcase 152 representing a particular version of the infrastructure model. Specifically, any of a variety of different techniques may be utilized to link one or more changesets 200 to a briefcase representing a particular version of the infrastructure model. The linking/association may be utilized by the extractor 125 to apply particular changesets 200 to a briefcase 152 to construct a briefcase 152 that represents a newer version of the infrastructure model, as described herein.

Figure 3A:
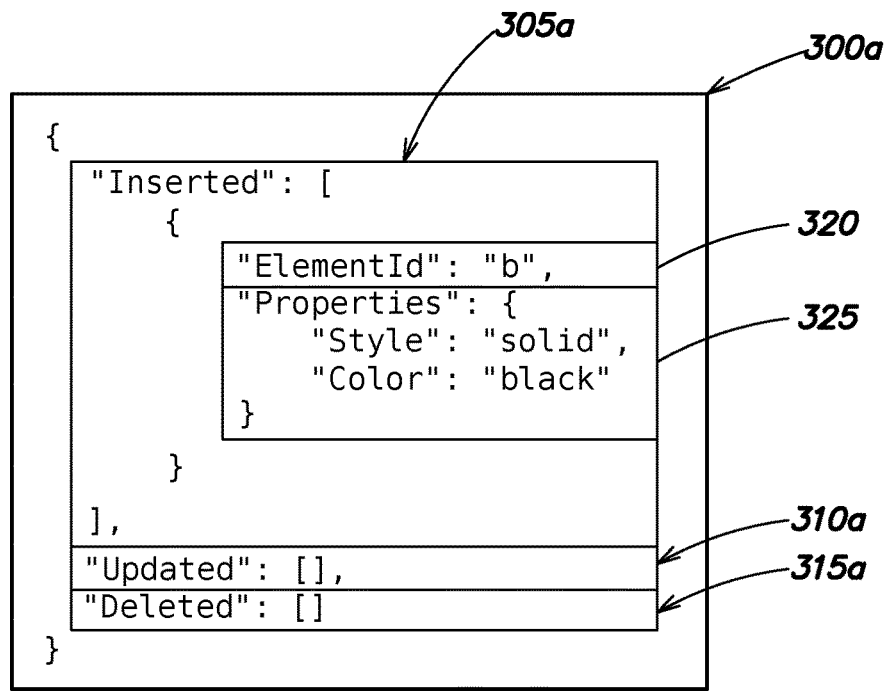
FIGS. 3A-3C are diagrams illustrating example change summaries that are generated in accordance with an example embodiment.
Figure 3B:
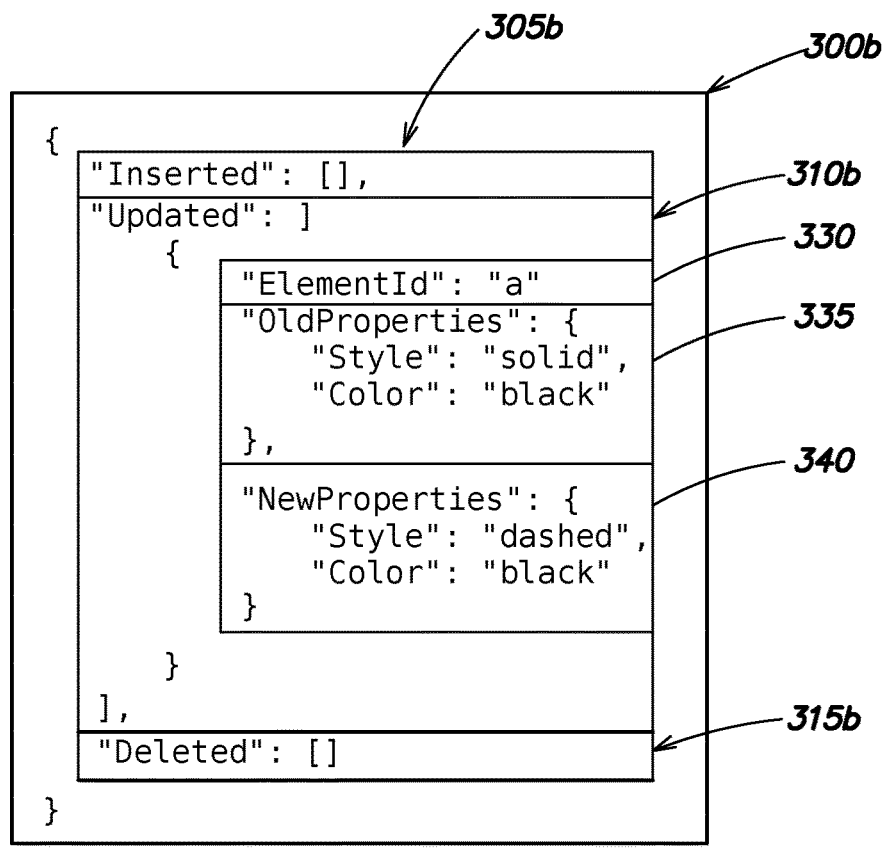
Figure 3C:
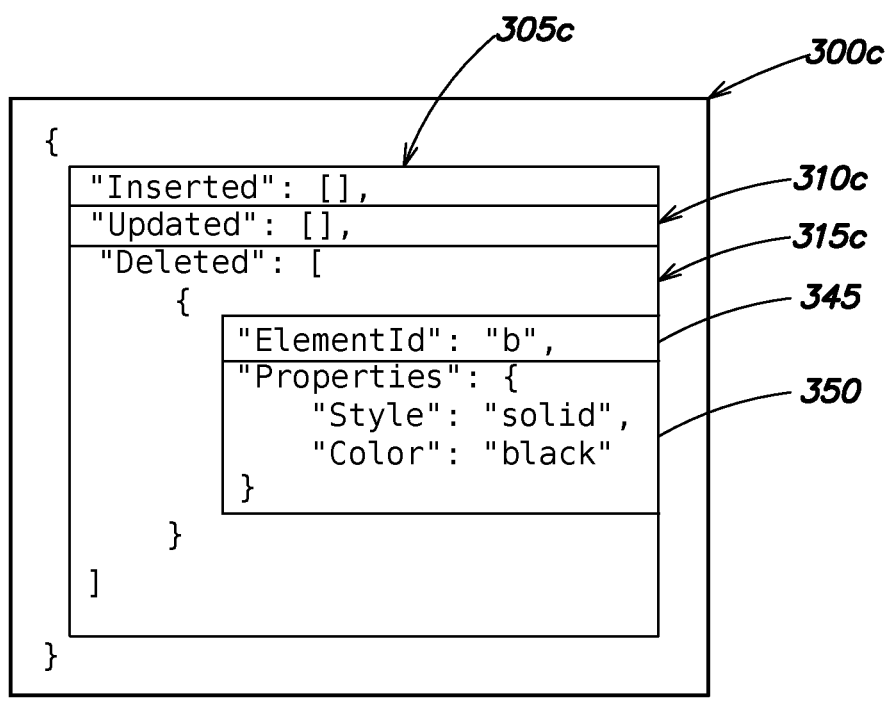

FIGS. 3A-3C are diagrams illustrating example change summaries 300*a*-300*c* that are generated in accordance with an example embodiment. Specifically, the extractor 125 may obtain a briefcase 152 representing a particular version of an infrastructure model and one or more changesets 200 via the infrastructure modeling hub services 130 and from a repository of the one or more repositories 132-134. Based on receiving the briefcase 152 and one or more changesets 200, the extractor 125 may 1*o* generate one or change summaries 300 according to the one or more embodiments described herein. Each change summary 300 may, for example, includes a different field for a different type of modification made between consecutive versions of an infrastructure model. For example, each change summary may include an inserted field (305*a*-305*c*), an updated field (310*a*-310*c*), and a deleted field (315*a*-315*c*). In addition, the change summaries 300*a*-300*c* may be in a JSON format, BSON format, XML format, or a similar format. Further, the extractor 125 may generate a change summary 300 as part of a background process and at one or more particular times, on a predetermined scheduled, or, for example, when a new version of an infrastructure model is created. Alternatively, the extractor 125 may generate a change summary 300 based on a user command.

Following the above example, change summaries 300*a*-300*c* as depicted in FIGS. 3A-3C are generated based on the versions (260*a*-260*d*) of the infrastructure model and changesets 200*a*-200*h* of FIGS. 2A-2D. Specifically, the extractor 125 may obtain the briefcase 152 representing version one 260*a* of the infrastructure model and changeset 200*f* via the infrastructure modeling hub services 130 and from a repository of the one or more repositories 132-134. In response to receiving the briefcase 152 and the changeset 200*f*, the extractor 125 may generate change summary 300*a* as depicted in FIG. 3A.

Specifically, the extractor 125 may apply the changeset 200*f* to the briefcase 152 representing version one 260*a* of the infrastructure model to construct the briefcase 152 representing version two 260*b* of the infrastructure model. The extractor 125 may store a copy of the constructed briefcase 152 representing version two 260*b* of the infrastructure model and then "roll-back", e.g., undo, the applied changes to obtain the briefcase 152 representing version one 260*a* of the infrastructure model. The extractor 125 may then compare the briefcases 152 representing consecutive versions of the infrastructure model, e.g., versions two 260*b* and one 260*a*, to determine the differences between the consecutive versions. Specifically, the extractor 125 may utilize an application program interface (API) to compare the briefcases 152 representing consecutive versions, e.g., versions two 260*b* and one 260*a*, of the infrastructure model to determine the differences and generate change summary 300*a* as depicted in FIG. 3A.

Specifically, and based on the example, element b 270*f* is inserted in version one 260*a* to create version two 260*b* of the infrastructure model. As such, and based on the comparison of the briefcases 152, the extractor 125 determines that the insertion of element b 270*f* is the modification between version one 260*a* and version two 260*b* of the infrastructure model. Therefore, the extractor 125 may generate change summary 300*a* that includes a field for each type of modification. Specifically, the inserted field 305*a* for change summary 300*a* includes an element identifier subfield 320 that stores an element identifier of "b" indicating that element b was inserted, and a properties subfield 325 that stores one or more property values indicating that element b 270*f* is a "solid" line and "black' in color. Although reference is made to the properties subfield 325 storing one or more physical properties of the element, it is expressly contemplated that the properties subfield 325 may store one or more other types of properties associated with the element. For example, the one or more other types of properties may include, but are not limited to, construction lead time associated with the element, cost associated with the element, risk index value associated with the element, a schedule associated with the element, a carbon footprint associated with the element, etc.

Because the modifications between version one 260*a* and version two 260*b* do not include any update or deletion type modifications, updated field 310*a* and deleted field 315*a* of change summary 300*a* are left empty/blank. Change summary 300*a* may be in a JSON format, BSON format, XML format, or a similar format.

In addition and at a later point in time, for example, the extractor 125 may obtain the briefcase 152 representing version two 260*b* of the infrastructure model and changeset 200*g* via the infrastructure modeling hub services 130 and from a repository of the one or more repositories 132-134. In response to receiving the briefcase 152 and the changeset 200*g*, the extractor 125 may generate change summary 300*b* as depicted in FIG. 3B. Specifically, the extractor 125 may apply the changeset 200*g* to the briefcase 152 representing version two 260*b* of the infrastructure model to construct briefcase 152 representing version three 260*c* of the infrastructure model. The extractor 125 may store a copy of the constructed briefcase 152 representing version three 260*c* of the briefcase 152 and then "roll-back", e.g., undo, the applied changes to obtain the briefcase 152 representing version two 260*b* of the infrastructure model. The extractor 125 may then compare the briefcases 152 representing consecutive versions of the infrastructure model, e.g., versions three 260c and two 260b, to determine the differences between the consecutive versions. Specifically, the extractor 125 may utilize the API to compare the briefcases representing consecutive versions, e.g., versions three 260c and two 260b, of the infrastructure model to determine the differences and generate change summary 300b as depicted in FIG. 3B.

Specifically, and based on the example, element a 270a was updated in version two 260b to create version three 260c of the infrastructure model. As such, and based on the comparison of the briefcases 152, the extractor 125 determines that the update of element a 270a is the modification between version two 260b and version three 260c of the infrastructure model. Therefore, the extractor 125 may generate change summary 300b that includes a field for each type of modification. Specifically, updated field 310b for change summary 300b includes an element identifier subfield 330 that stores an element identifier of "a" indicating that element a 270a was updated, an old properties subfield 335 that stores one or more old property values indicating that element a 270a was a "solid" line and "black" in color in versions one 260a and two 260b of the infrastructure model, and a new properties subfield 340 that stores one or more new property values indicating that element a 270a is a "dashed" line and "black" in color in version three 260c of the infrastructure model. Because the modifications between version two 260b and version three 260c do not include any insertion or deletion type modifications, inserted field 305b and deleted field 315b of change summary 300b are left empty/blank. Change summary 300b may be in a JSON format, BSON format, XML format, or a similar format.

In addition and at an even later point in time, for example, the extractor 125 may obtain the briefcase 152 representing version three 260c of the infrastructure model and changeset 200h via the infrastructure modeling hub services 130 and from a repository of the one or more repositories 132-134. In response to receiving the briefcase 152 and the changeset 200h, the extractor 125 may generate change summary 300c as depicted in 1o FIG. 3C. Specifically, the extractor 125 may apply the changeset 200h to the briefcase 152 representing version three 260c of the infrastructure model to construct the briefcase 152 representing version four 260d of the infrastructure model. The extractor 125 may store a copy of the constructed briefcase 152 representing version four 260d of the briefcase 152 and then "roll-back", e.g., undo, the applied changes to obtain the briefcase 152 representing version three 260c of the infrastructure model. The extractor 125 may then compare the briefcases representing consecutive versions of the infrastructure model, e.g., versions four 260d and three 260c, to determine the differences between the consecutive versions. Specifically, the extractor 125 may utilize the API to compare the briefcases representing consecutive versions, e.g., versions four 260d and three 260c, of the infrastructure model to determine the differences and generate change summary 300c as depicted in FIG. 3C.

Specifically, and based on the example, element b 270f is deleted from version three 260c to create version four 260d of the infrastructure model. As such, and based on the comparison of the briefcases 152, the extractor 125 determines that the deletion of element b 270f is the modification between version three 260c and version four 260d of the infrastructure model. Therefore, the extractor 125 may generate change summary 300c that includes a field for each type of modification. Specifically, deleted field 315c of change summary 300c includes an element identifier subfield 345 that stores an element identifier of "b" indicating that element b 270f was deleted from version three 260c to create version four 260d of the infrastructure model, and a properties subfield 350 indicating the properties of element b 270f that was deleted from version three 260c. Because the modifications between version three 260c and version four 260d do not include any insertion or update type modifications, inserted field 305c and updated field 310c of change summary 300c are left empty/blank. Change summary 300c may be in a JSON format, BSON format, XML format, or a similar format.

Although the example with reference to FIGS. 3A-3C describes generating change summaries 300 based on receiving a particular briefcase and changesets that are applied to construct the very next (e.g., consecutive) briefcase 152, it is expressly contemplated that the extractor 125 may generate one or more change summaries 300 based on receiving a briefcase 150 and changesets 200 that are utilized to construct a briefcase 152 representing any newer version of the infrastructure model.

For example, the extractor 125 may receive a briefcase 152 representing version one 260a of the infrastructure model and changesets 200f and 200g. The extractor 125 may then apply changesets 200f and 200g to the briefcase 152 representing version one 260a to construct a briefcase 152 representing version three 260c of the infrastructure model. The extractor 125 may then store the briefcase 152 representing version three 260c of the infrastructure model and then "roll-back", i.e., undo, particular change to construct a briefcase representing version two 260b of the infrastructure model. The extractor 125 may compare the briefcases and then generate change summary 300b, as described above. The briefcase 152 representing version three 260c may be discarded and the extractor 125 may store the briefcase 152 representing version two 260b. The extractor 125 may then "roll-back", i.e., undo, particular changes to construct a briefcase representing version one 260a of the infrastructure model, and compare the briefcases 152 to generate change summary 300a, as described above. As such, the extractor 125 may generate the change summaries 300 based on the application of one or more changesets 200 to construct a newer briefcase 152 to then compare the briefcases 152, as described herein.

The structure of the change summaries 300 and the values and information stored in the change summaries 300 are for exemplary purposes only. It is expressly contemplated that the change summaries 300 described herein may have different structures and include less, additional, or other information that describes the changes between briefcases representing different versions of the infrastructure model. Further, although reference is made to the change summaries 300 storing values/identifiers in different/separate fields or subfields, it is expressly contemplated that multiple values may be stored in the same field or subfield. As such, the configuration of the change summaries 300 is for exemplary purposes only.

Figure 4:
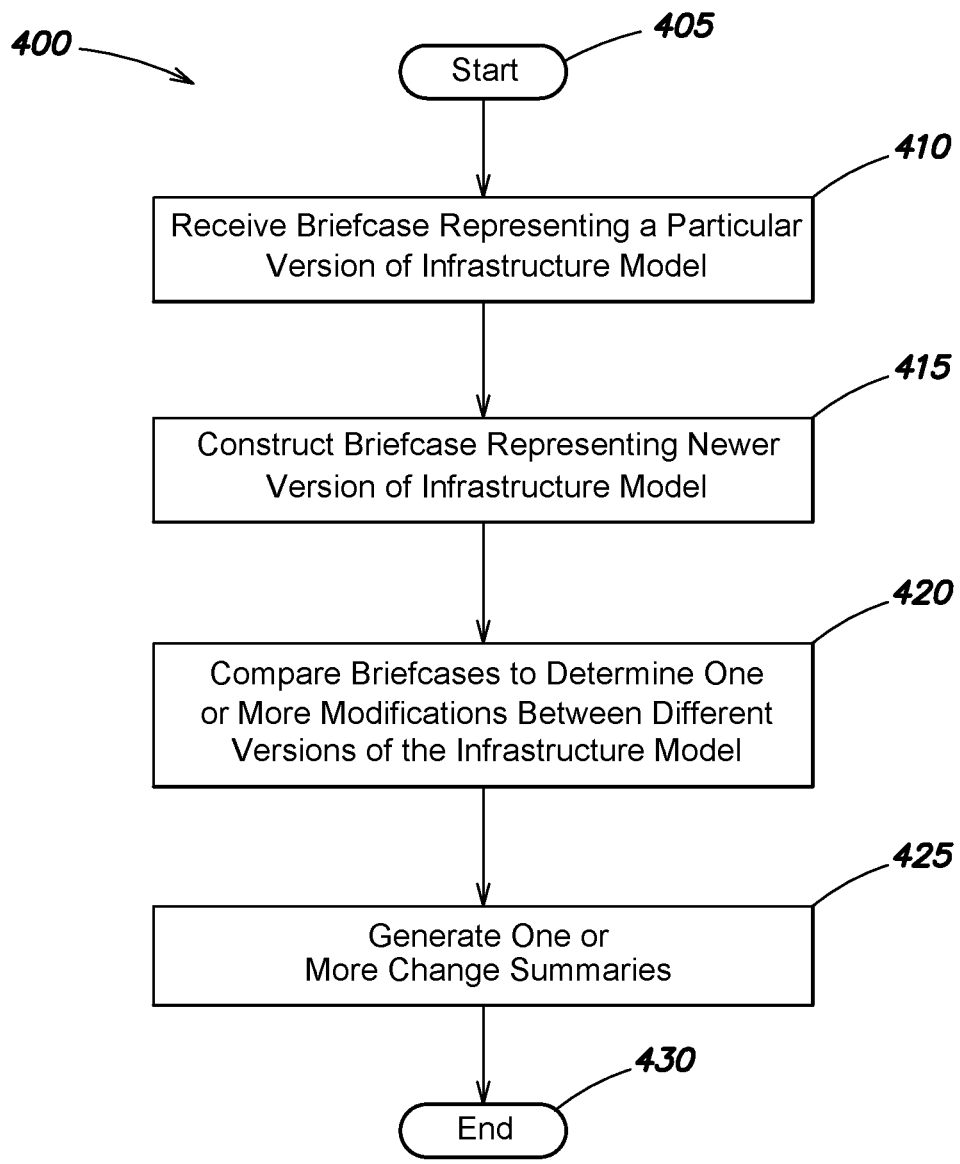
FIG. 4 is a flow diagram for generating one or more change summaries in accordance with an example embodiment.

FIG. 4 is a flow diagram for generating one or more change summaries in accordance with an example embodiment. The procedure 400 starts at step 405 and continues to step 410 where a briefcase 152 representing a particular version of an infrastructure model and one or more changesets 200 are received. Each changeset 200 may include information associated with one or more changes made to the infrastructure model during a particular time span. For example, the extractor 125 may issue a request that includes an infrastructure ID, a model ID, and a version ID. Based on the request, the extractor 125 may receive a particular briefcase 152 representing a particular version of an infrastructure model and may also receive one or more changesets 200 utilized to construct a briefcase representing a newer version of the infrastructure model.

Alternatively, the briefcase 152 and one or more changesets 200 may be "pushed" to the extractor 125. Specifically, the extractor 125 may receive the briefcase 152 and the one or more changesets 200 via the infrastructure modeling hub services 130 and from a repository of the repositories 132-134. The briefcase 152 and each changeset 200 may, for example, be in a format that is consistent or compatible with a relational database (e.g., SQLite database).

With reference to the example above, let it be assumed that the extractor 125 receives a briefcase 152 representing version one 260a of the infrastructure model and changeset 200f. The procedure continues to step 415 and a briefcase 152 representing a newer version of the infrastructure model is constructed. Specifically, the extractor 125 may apply the one or more changesets 200 to the particular briefcase 152 received via the infrastructure modeling hub services 130. In this example, the extractor 125 applies changeset 200f to briefcase 152 representing version one 260a of the infrastructure model to construct briefcase 152 representing version two 260b of the infrastructure model. The procedure continues to step 420 and briefcases are compared to determine one or more modifications between different versions of the infrastructure model. Specifically, and for this example, the extractor stores the briefcase 152 representing version two 260b of the infrastructure model, and then "rolls-back", i.e., undoes the applied change to construct the briefcase 152 representing version one 260a of the infrastructure model. The extractor 125 may then utilize an API to compare the briefcases 152 and determine (i.e., identify) the differences between consecutive versions of the infrastructure model. In this example, and based on the comparison, the extractor 125 determines that element b was inserted in version one 260a of the infrastructure model to create version two 260b of the infrastructure model.

The procedure continues to step 425 and one or more change summaries 300 are generated. Specifically, the extractor 125 generates a change summary 300 that includes a different field for a different type of modification (e.g., insertion, deletion, update, etc.) made between versions (e.g., consecutive versions) of the infrastructure model. In addition, the change summary 300 may be in a JSON format, BSON format, XML format, or a similar format. Further, the extractor 125 may generate a change summary 300 as part of a background process and at one or more particular times, at a predetermined scheduled, or, for example, when a new version of an infrastructure model is created. Alternatively, the extractor 125 may generate a change summary 300 based on a user command. In this example, the extractor 125 generates a change summary 300a that indicates the element b 270f was inserted in version one 260a to create version two 260b of the infrastructure model. In addition, the change summary 300a includes the properties (e.g., solid line that is black in color) of element b 270f that was inserted. The change summary 300a may be stored on repository 135. The procedure ends at step 430.

FIGS. 5A-5D are example aggregated model version data that are updated as newer/current versions of an infrastructure model are created in accordance with an example embodiment. The extractor 125 may generate aggregated model version data 500 as the infrastructure model transitions to current/newer versions. Specifically, the extractor 125 may update the aggregated model version data 500 utilizing the generated change summaries 300 such that the aggregated model version data 500 is comprehensive and complete regarding each and every element that is and was included in the infrastructure model from its genesis to its current state. Specifically, for each element inserted or updated in a version of the infrastructure model, a new entry is generated for the aggregated model version data 500. For each element deleted from a particular version of an infrastructure model, the entry for the deleted element may still be maintained within the data aggregated model version data 500, but the highest value included in a version field of the entry for the deleted element is a value of the particular version of the infrastructure model from which the element was deleted.

The extractor 125 may first create the aggregated model version data 500 for an initial version (e.g., version one) of the infrastructure model. Continuing with the example above, the extractor 125 may utilize the API to analyze the briefcase 152 representing version one 260a and/or the associated changesets 200a-200e to determine the elements included in version one 260a of the infrastructure model. In this example, and based on the analysis, the extractor 125 determines that elements a 270a, element u 270b, element v 270c, element w 270d and element x 270e are included in version one 260a of the infrastructure. Based on this determination, the extractor 125 may generate the aggregated model version data 500a of FIG. 5A.

Figure 5A:
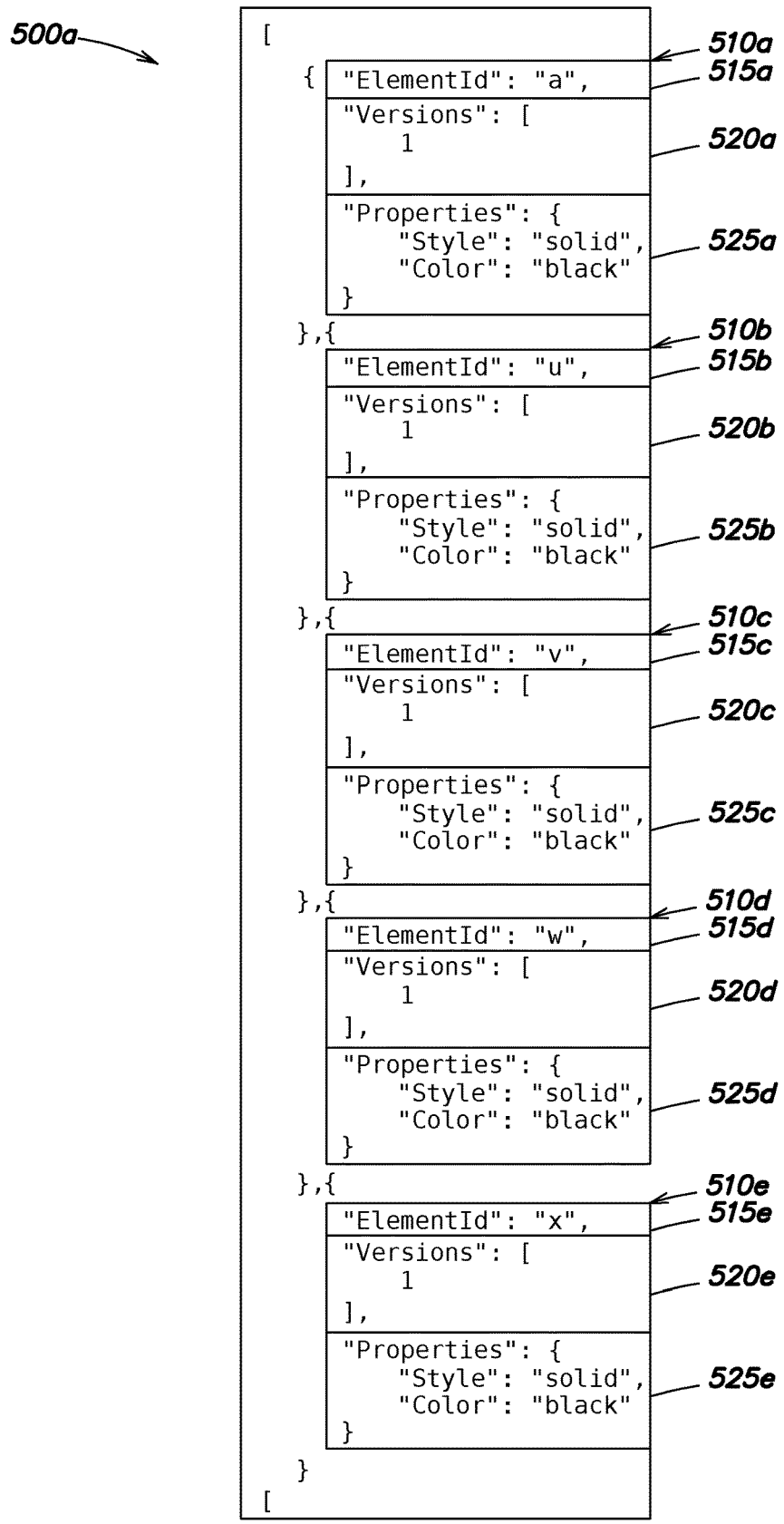
FIGS. 5A-5D are example aggregated model version data that are updated as newer/current versions of an infrastructure model are created in accordance with an example embodiment.

The aggregated model version data 500a of FIG. 5A includes a plurality of entries 510a-510e, where each entry includes an element identifier field, e.g., 515a-515e, that indicates an identifier of the element, a version field, e.g., 520a-520e, that indicates one or more versions of the infrastructure model the element is included in, and a properties field, e.g., 525a-525e, that indicates one or more properties of the element.

In this example, element a, u, v, w, and x respectively correspond to entries 510a, 510b, 510c, 510d, and 510e. In addition, since each element was inserted to create version one 260a of the infrastructure model, each version field, 520a-520e, store an identifier of "1". Furthermore, since each element is a "solid" line that is "black" in color, each properties field, 525a-525e, stores property values indicating that the elements are solid lines and black in color. Although reference is made to the properties fields 525a-525e storing one or more physical properties of the elements, it is expressly contemplated that the properties fields may store one or more other types of properties associated with the element. For example, the one or more other types of properties may include, but are not limited to, construction lead time associated with the element, cost associated with the element, risk index value associated with the element, a schedule associated with the element, a carbon footprint associated with the element, etc.

Figure 5B:
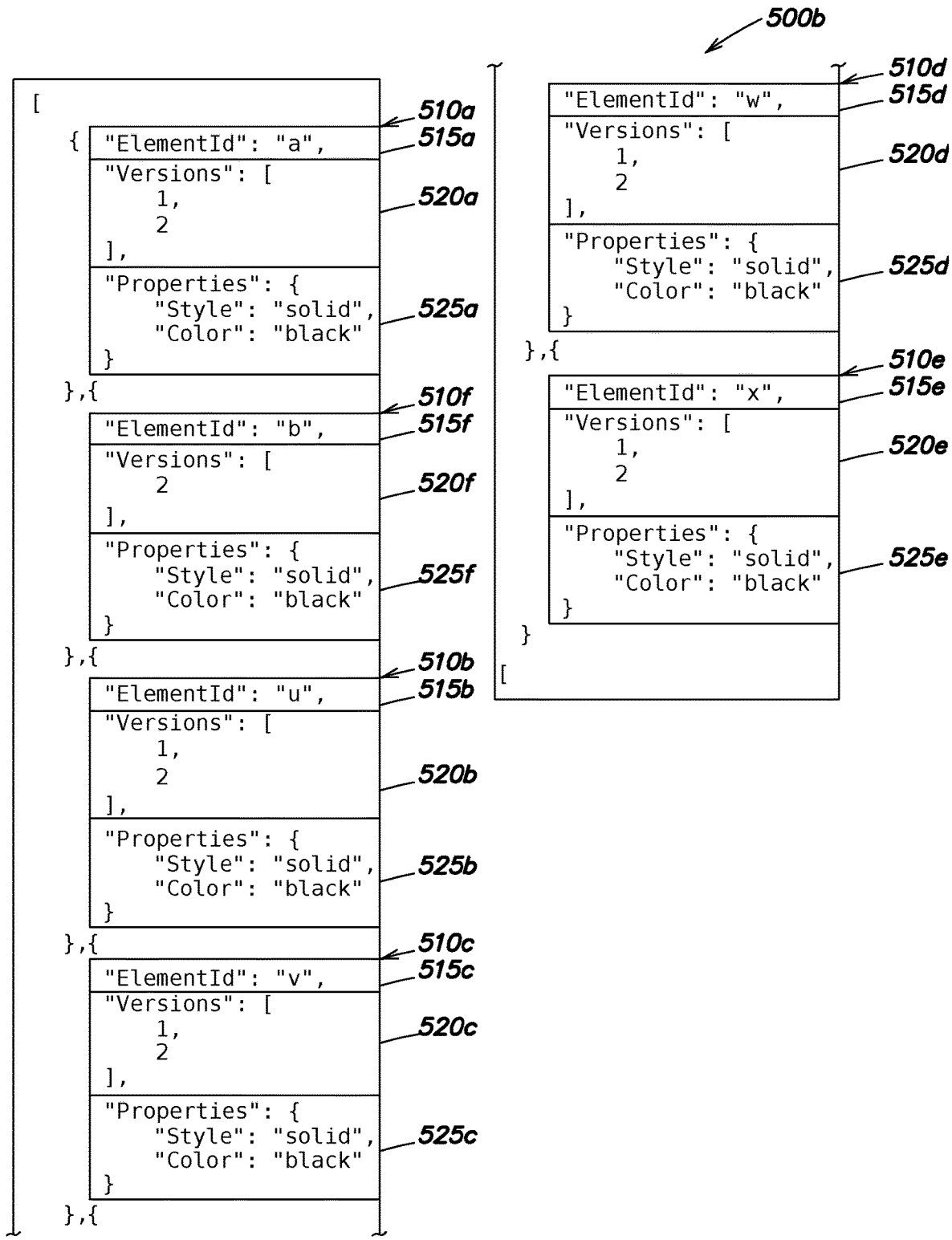

After a newer version of the infrastructure model, e.g., version two 260b, is created and a corresponding change summary, e.g., change summary 305a, is generated, the extractor 125 may update the aggregated model version data 500. Specifically, the extractor 125 may utilize the change summary 305a, indicating the modifications between version one 260a and version two 260b of the infrastructure model, to update the aggregated model version data 500. Specifically, the extractor 125 may utilize the API to analyze the change summary 305a and determine that element b 270f was inserted in version one 260a to create version two 260b of the infrastructure model. As such, the extractor 125 may create a new entry 510f for the aggregated model version data 500b as depicted in FIG. 5B. The entry 510f for the aggregated model version data 500b includes element identifier field 515*f* that stores identifier "b" indicating that element b is included in the infrastructure model. In addition, version field 520*f* stores a value of "2" indicating that element b is included in version two 260*b* of the infrastructure model. Further, properties field 525*f* stores one or more property values indicating that element b 270*f* is a "solid" line and "black' in color. Moreover, the extractor 125 may update version fields 520*a*-520*e* to include a value of "2" indicating that elements a, u, v, w, and x are also included in version two 260*b* of the infrastructure model.

Figure 5C:
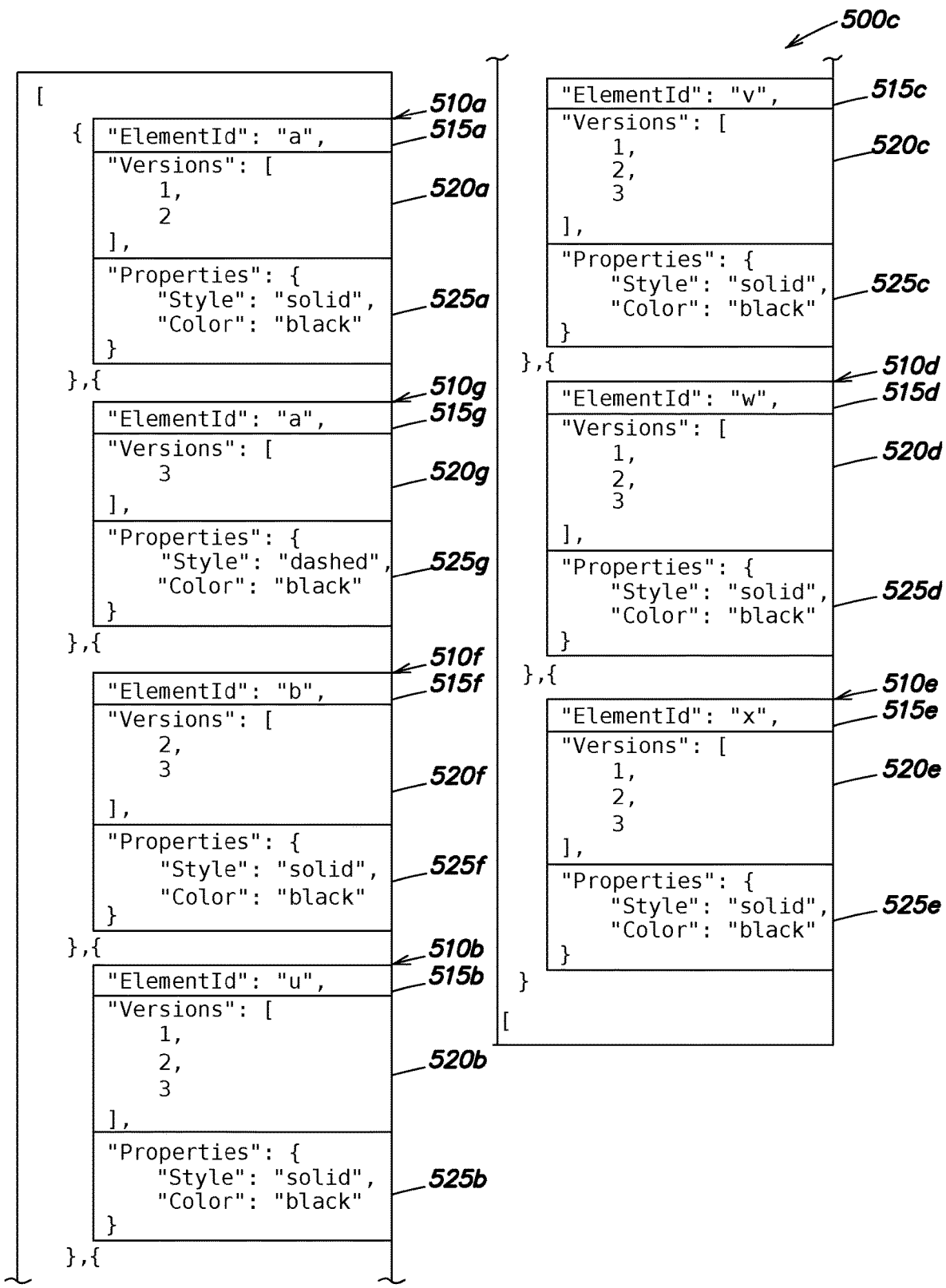

After version three 260*c* of the infrastructure model is created and the corresponding change summary 305*b* is generated, the extractor 125 may update the aggregated model version data 500. Specifically, the extractor 125 may utilize the change summary 305*b*, indicating the modifications between version two 260*b* and version three 260*c* of the infrastructure model, to update the aggregated model version data 500. Specifically, the extractor 125 may utilize the API to analyze the change summary 305*b* and determine that element a 270*a* was updated from a solid line and black in color to a dashed line and black in color. As such, the extractor 125 may create a new entry 510*g* for the aggregated model version data 500*c* as depicted in FIG. 5C.

The entry 510*g* for the aggregated model version data 500*c* includes element identifier field 515*g* that stores identifier "a" identifying element a 270*a*. In addition, version field 520*g* stores a value of "3" indicating that element a 270*a*, as updated, is included in version three 260*c* of the infrastructure model. Further, properties field 525*g* stores one or more property values indicating that element a 270*a*, as updated, is a "dashed" line and "black' in color. Therefore, the aggregated model version data 500*c* includes two different entries, e.g., 510*a* and 510*g*, for element a 270*a*. Specifically, entry 510*a* corresponds to original element a 270*a* as a solid line and black in color, and entry 510*g* corresponds to updated element a 270*a* as a dashed line and black in color. Since the original element a 270*a* is included in versions one 260*a* and two 260*b* and not in version three 260*c* of the infrastructure model, the version field 520*a* only stores values "1" and "2" in aggregated model version data 500*c*. In addition, because updated element a 270*a* is only included in version three 260*c*, version field 520*g* only stores a value of "3". Moreover, the extractor 125 may update version fields 520*b*-550*f* to include a value of "3" indicating that elements b, u, v, w, and x are also included in version three 260*c* of the infrastructure model.

After version four 260*d* of the infrastructure model is created and the corresponding change summary 305*c* is generated, the extractor 125 may update the aggregated model version data 500. Specifically, the extractor 125 may utilize the change summary 305*c*, indicating the modifications between version three 260*c* and version four 260*d* of the infrastructure model, to update the aggregated model version data 500. Specifically, the extractor 125 may utilize the API to analyze the change summary 305*c* and determine that element b 270*f* was deleted from version three 260*c* of the infrastructure model to create version four 260*d* of the infrastructure model.

Figure 5D:
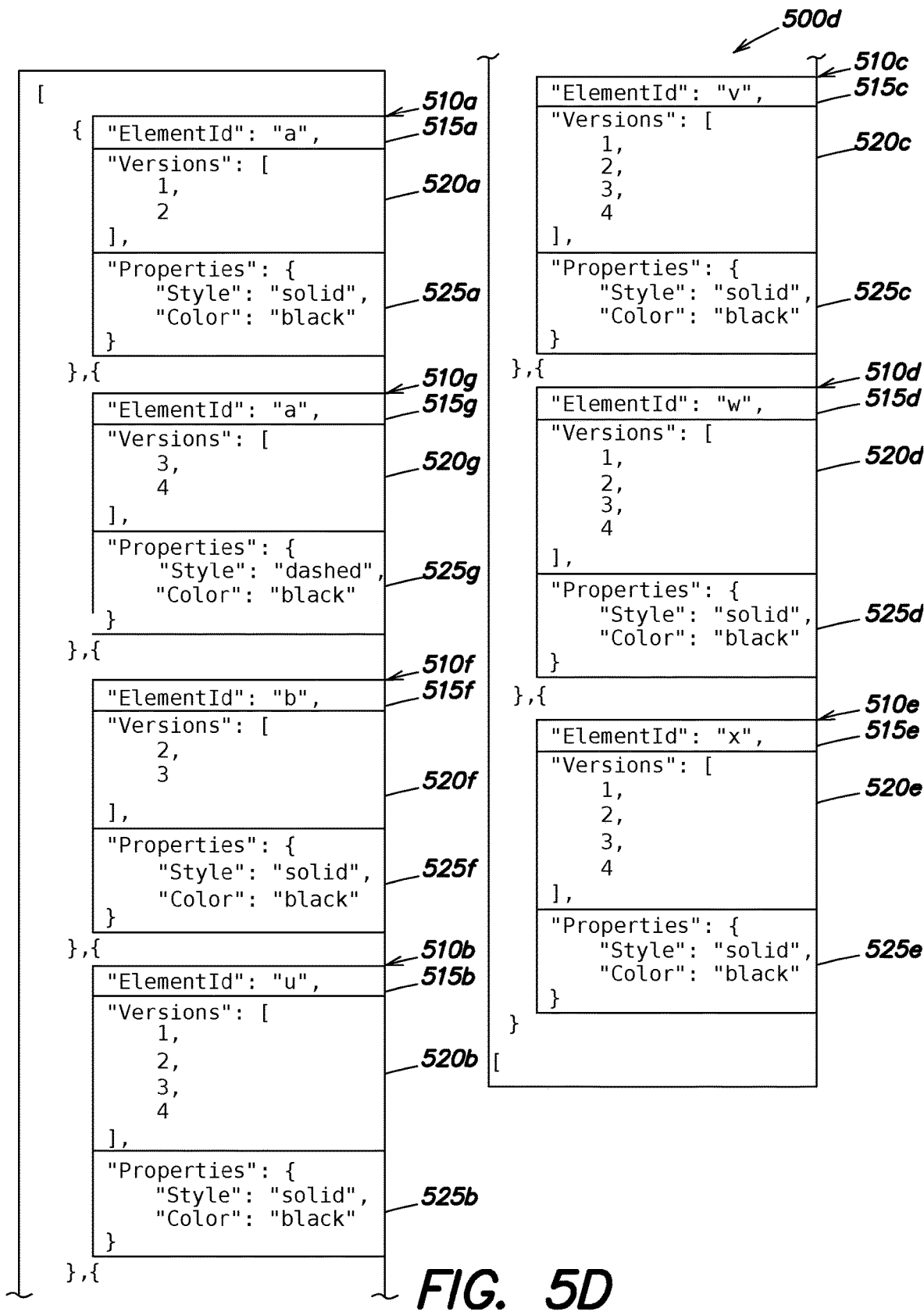

As such, the extractor may update the version fields 520*b*-520*e* and 520*g* to include a value of "4" indicating that elements a (updated), u, v, w, and x are included in version four 260*d* of the infrastructure model. Thus, and although element b 270*f* is not included in version four 260*d* of the infrastructure model, entry 510*f* is still maintained in the aggregated model version data 500*d*. In addition, and although original element a 270*a* is not included in version four 260*d* of the infrastructure model, entry 510*a* is still maintained in the aggregated model version data 500*d* as depicted in FIG. 5D. Advantageously, the aggregated model version data 500*d* provides comprehensive and complete information regarding each and every element that is and was included in the infrastructure model from its genesis to its current state.

Figure 6:
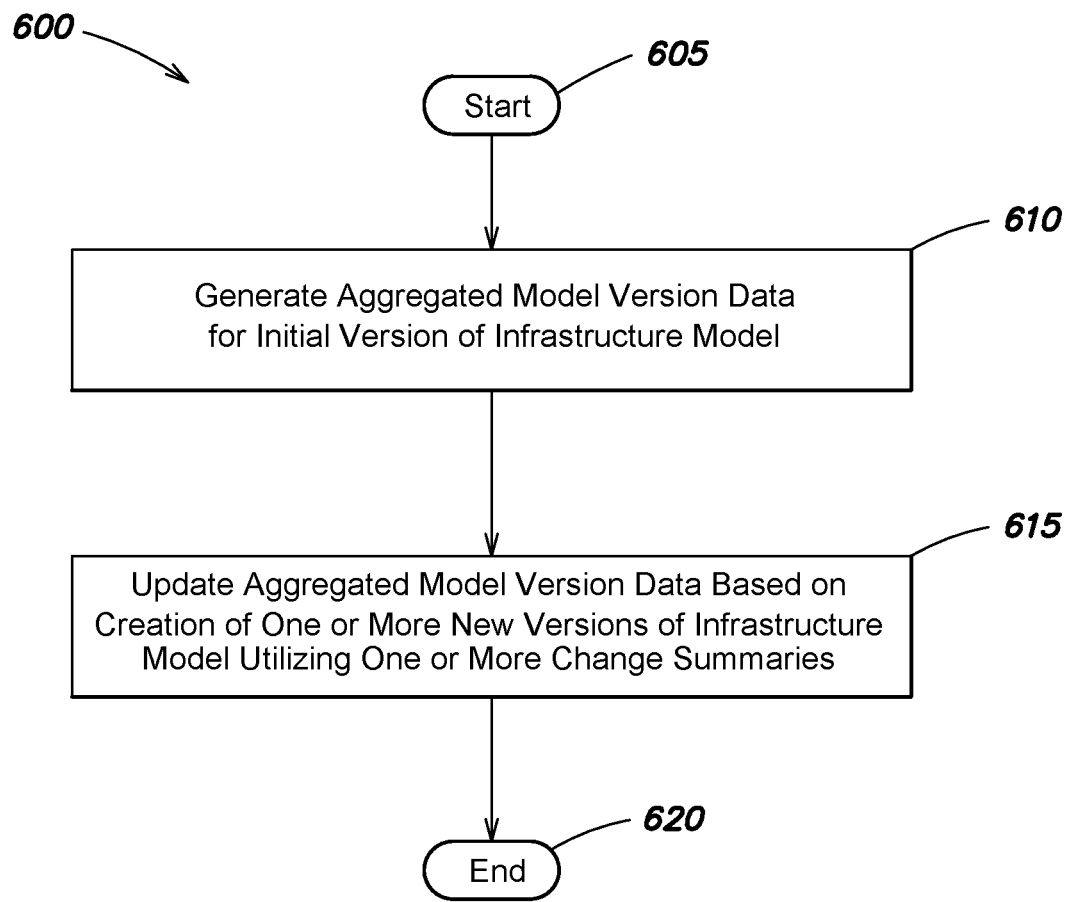
FIG. 6 is a flow diagram for generating aggregated model version data in accordance with an example embodiment.

FIG. 6 is a flow diagram for generating aggregated model version data in accordance with an example embodiment. The procedure 600 starts at step 605 and continues to step 610 where aggregated model version data 500 is generated for an initial version of infrastructure model. Specifically, the extractor 125 may receive the briefcase 152 representing the initial version 260*a* (e.g., version one) of the infrastructure model via the infrastructure modeling hub services 130. The extractor 125 may utilize the API to analyze the briefcase representing version one 260*a* of the infrastructure model to determine that elements a 270*a*, u 270*b*, v 270*c*, w 270*d*, and x 270*e* are included in the initial version 260*a* of the infrastructure model. Alternatively, the extractor 125 may receive an empty briefcase (version zero) and changesets 200*a*-200*e* to construct version one 260*a* of the infrastructure model, and the API may determine that elements a 270*a*, u 270*b*, v 270*c*, w 270*d*, and x 270*e* are included in version one 260*a* of the infrastructure model. Alternatively, the API may analyze the changesets 200*a*-200*e* to determine that elements a 270*a*, u 270*b*, v 270*c*, w 270*d*, and x 270*e* are included in the version one 260*a* of the infrastructure model.

The procedure continues to step 615 and the aggregated model version data 500 is updated based on the creation of one or more new versions of the infrastructure model utilizing one or more change summaries 300. For example, the extractor 125 may generate change summary 300*a* based on the creation of version two 260*b* of the infrastructure model as described above. The API of the extractor 125 may analyze the change summary 300*a* to determine that element b 270*f* was inserted in version one 260*a* of the infrastructure model to create version two 260*b* of the infrastructure model. Therefore, the extractor 125 may update the aggregated model version data 500 to include new entry 510*f* for element b 270*f*. In addition, the version fields 520*a*-520*e* may be updated to indicate elements a, u, v, w, and x are also included in version two 260*b* of the infrastructure model.

Alternatively, the extractor 125 may update the aggregated model version data 500 after the creation of multiple versions of the infrastructure model and the generation of multiple change summaries 300. For example, the extractor 126 may generate change summaries 300*a*, 300*b*, and 300*c* as described above. The API of the extractor 125 may analyze the change summaries 300*a*, 300*b*, and 300*c* to determine that element b 270*f* was inserted in version one 260*a* of the infrastructure model to create version two 260*b*, element a 270*a* was updated in version two 260*b* of the infrastructure model to create version three 270*c*, and element b 270*f* was deleted from version three 260*c* of the infrastructure model to create version four 270*d*. As such, the API of the extractor 125 may update the aggregated model version data 500 to include new entry 510*f* for element b 270*f* and new entry 510*g* for updated element a 270*a*. In addition, the entry 510*f* for element b 270*f* may still be maintained in the aggregated model version data 500*b*, but is the version field 520*f* only includes values of 2 and 3 since element b was not included in version one 260*a* and version four 260*d* of the infrastructure model. In addition, the version fields 520*a*-520*g* may be updated to indicate the versions of the infrastructure model that the elements are included in.

As such, for each element inserted or updated in a version of the infrastructure model, a new entry is generated for the aggregated model version data 500. For each element deleted from a particular version of an infrastructure model, the entry for the deleted element may still be maintained within the data aggregated model version data 500, but the highest value included in the version field of the entry for the deleted element is a value of the particular version of the infrastructure model from which the element was deleted. Accordingly, the extractor 125 updates the aggregated model version data 500 utilizing the generated change summaries 300 such that the aggregated model version data 500 is comprehensive and complete regarding each and every element that is and was included in the infrastructure model from its genesis to its current state. The procedure ends at step 620.

Figure 7:
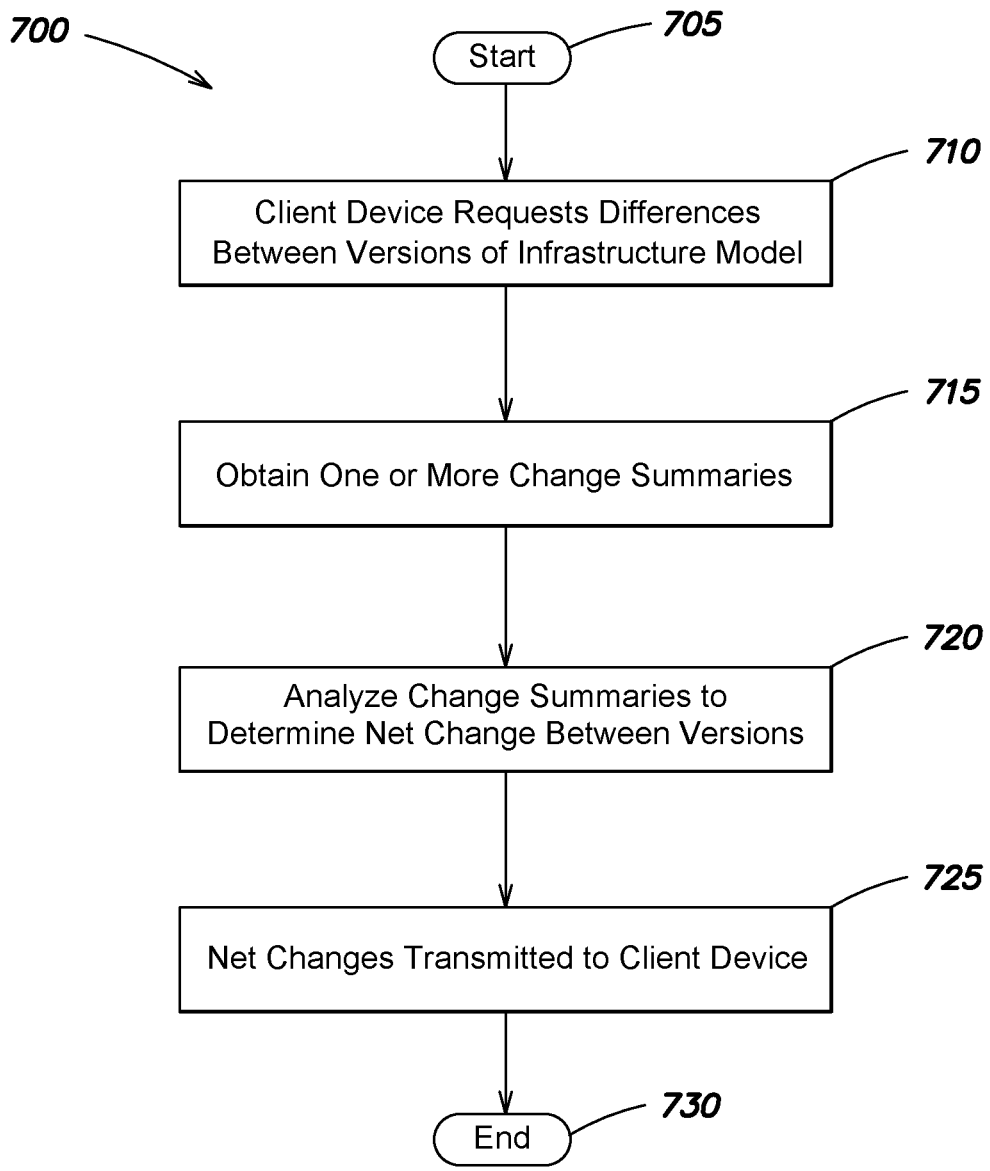
FIG. 7 is a flow diagram for providing change summary data indicating differences between versions of an infrastructure model in accordance with an example embodiment.

FIG. 7 is a flow diagram for providing change summary data indicating differences between versions of an infrastructure model in accordance with an example embodiment. The procedure 700 starts at 705 and continues to step 710, where a client device 150 requests differences between versions of an infrastructure model. For example, the client device 150 may utilize web user interface 105 to transmit the request from the web-application software 110 to the infrastructure data analytics services 145 of the cloud-based software 120. For example, a user operating client device 150 may want the differences between version one 260*a* and version four 260*d* of the infrastructure model. The request may include an infrastructure ID, a model ID, and version IDs that identify versions one 260*a* and four 260*d*.

The procedure continues to step 715 and the infrastructure data analytics services 145 obtains one or more change summaries 300 based on the request. In this example, the user requested the differences between version one 260*a* and version four 260*d*. As such, the infrastructure data analytics services 145 obtains, from repositories 135, change summaries 300*a*, 300*b*, and 300*c*. The procedure continues to 720, and the infrastructure data analytics services 145 analyze the obtained change summaries 300 to determine the net change between the versions. In this example, and based on the change summaries 300*a* and 300*c*, the infrastructure data analytics services 145 determines element b 270*f* was inserted in version one 260*a* to create version two 260*b* of the infrastructure model, but also deleted from version three 260*c* to create version four 260*d* of the infrastructure model. Therefore, the infrastructure data analytics services 145 determines that the net result (change) of the insertion and deletion of element b 270*f* is zero between version one 260*a* and version four 260*d*. In addition, and based on change summary 300*b*, the infrastructure data analytics services 145 determines that element a was updated. As such, the infrastructure data analytics services 145 determines that the net change between version one 260*a* and version four 260*d* is that element a 270*a* was updated.

The procedure continues to step 725 and the net change is transmitted to the client device 150. Specifically, the infrastructure data analytics services 145 may provide, via the GUI or the CLI, the net change between versions of the infrastructure model to the client device 150. In this example, the infrastructure data analytics services 145 may provide to the client device 150, via the GUI or CLI, that the net change between version one 260*a* and version four 260*d* was the update of element a, and that element a was updated from a solid line that is black in color to a dashed line that is black in color. In an embodiment, the properties may include other types of properties, e.g., construction lead time associated with the element, cost associated with the element, risk index value associated with the element, a schedule associated with the element, a carbon footprint associated with the element, etc. The infrastructure data analytics services 145 may provide the other type of properties to the client device 150 via the GUI or CLI. Thus, and when the other properties are included, the client device 150 may be provided with the differences in schedule, cost, etc., between versions. The procedure ends at step 730.

Figure 8:
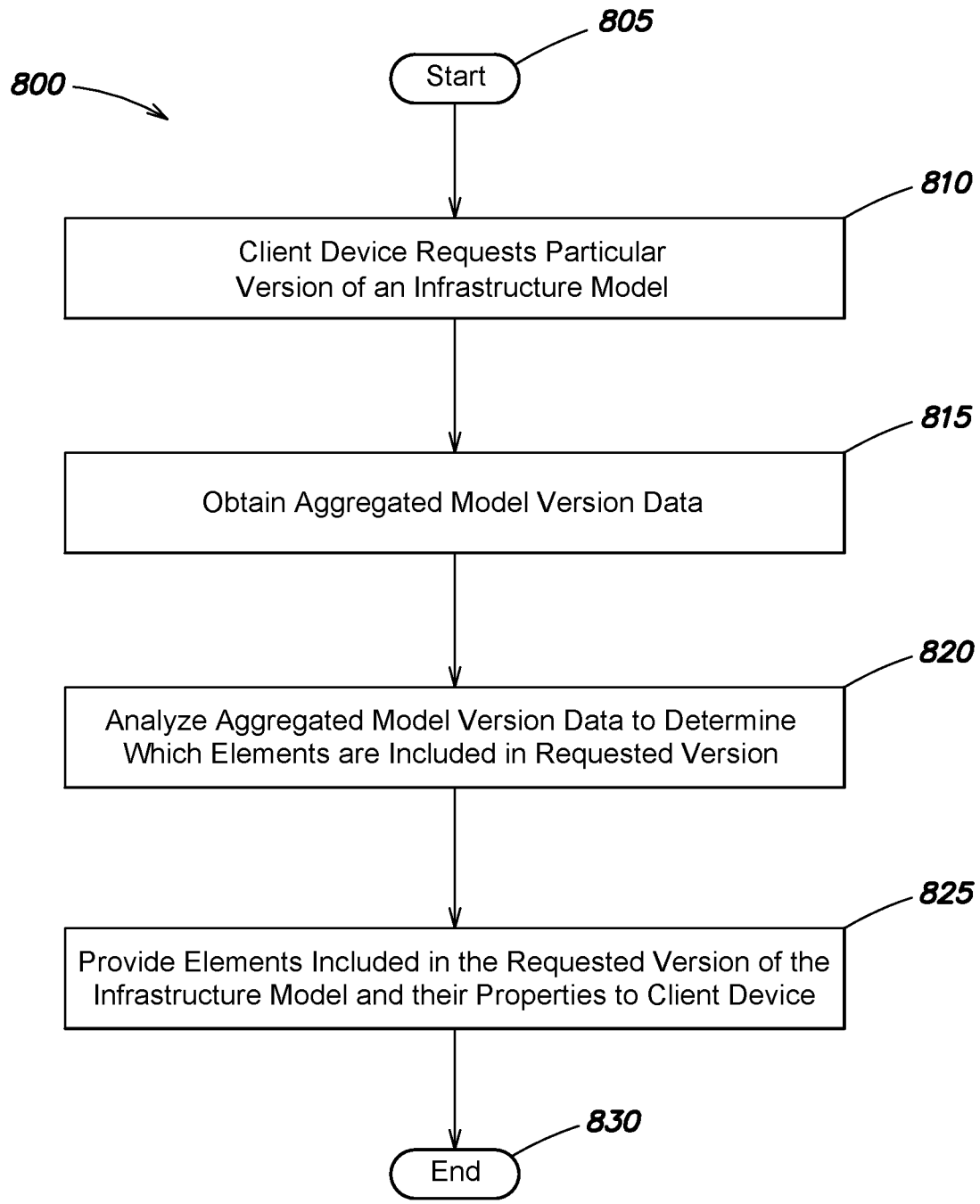
FIG. 8 is a flow diagram for providing a version of an infrastructure model in accordance with an example embodiment.

FIG. 8 is a flow diagram for providing a version of an infrastructure model in accordance with an example embodiment. The procedure 800 starts at 805 and continues to step 810, where a client device 150 requests a particular version of an infrastructure model. For example, the client device 150 may utilize web user interface 105 to transmit is the request from the web-application software 110 to the infrastructure data analytics services 145 of the cloud-based software 120. For example, a user operating client device 150 may want version three 260*c* of the infrastructure model. The request may include an infrastructure ID, a model ID, and a version ID for version three 260*c*.

The procedure continues to step 815 and the infrastructure data analytics services 145 obtains the aggregated model version data 500. As such, the infrastructure data analytics services 145 obtains, from repositories 140, the aggregated model version data 500*d* that has been generated and updated based on the infrastructure model transitioning from version one 260*a* through version four 260*d*. The procedure continues to 820, and the infrastructure data analytics services 145 analyze the aggregated model version data 500*d* to determine which elements are included in the requested version. In this example, the infrastructure data analytics services 145 determines which entries in the aggregated model version data 500*d* include a version field, 520*a*-520*g*, that include a value referencing version three 260*c* (e.g., "3"). In this example, the version fields for entries 520*g*, 520*f*, 520*b*, 520*c*, 520*d*, 520*e* (that respectively correspond to elements a (updated), b, u, v, w, and x) all include a value of "3". As such, the infrastructure data analytics services 145 determines that elements a (updated), b, u, v, w, and x are all included within version three 260*c* of the infrastructure model.

The procedure continues to step 825 and the infrastructure data analytics services 145 provides the elements included in the requested version of the infrastructure model and their properties to a client device 150. Specifically, the infrastructure data analytics services 145 may provide, via a GUI or a CLI, the elements and their properties. Specifically, the infrastructure data analytics services 145 may provide, via the GUI or the CLI, a listing of the elements included in version three 260*c* and their properties. Alternatively, the infrastructure data analytics services 145 may provide, via the GUI or CLI, version three 260*c* of the infrastructure model. The procedure ends at step 830.

Thus, the creation of the change summaries 300 and aggregated model version data 500 and their structures allow for more efficient searches that require less processing capabilities than searches that utilize, for example, relational databases. As such, because of the reduced processing requirements needed to perform searches, the techniques described herein provide an improvement to the underlying computer that performs the searches. Further, the techniques described herein allow the client device 150 to obtain detailed information about the infrastructure model from its genesis to its current state utilizing the change summaries 300 and aggregated model version data 500. In addition, the techniques described herein allow for cross property queries to inspect changes even if, for example, a user defined schema is updated/changed during a project execution for the infrastructure model. Thus, the techniques described herein provide an improvement in the existing technological field of computer-based infrastructure modeling systems.

It should be understood that a wide variety of adaptations and modifications may be made to the techniques. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. An infrastructure modeling system, comprising:
a processor configured to:
    receive, from a repository, a first briefcase representing a first version of an infrastructure model that represents a real-word entity;
    receive one or more changesets from the repository, wherein each changeset includes information associated with one or more changes made to the first briefcase;
    construct a second briefcase representing a second version of the infrastructure model, wherein the first version of the infrastructure model and the second version of the infrastructure model are different;
    compare the first briefcase and the second briefcase to determine one or more modifications between the first version and the second version of the infrastructure model;
    generate a change summary that stores information indicating the one or more modifications made to the infrastructure model between the first version and the second version of the infrastructure model that represents the real-word entity; and
    generate, utilizing the change summary, aggregated model version data that includes a plurality of aggregate model entries,
        wherein a particular aggregate model entry is generated (1) for each inserted model element that is inserted in the second version of the infrastructure model and indicated in the change summary, and (2) for each updated model element that is updated in the second version of the infrastructure model and indicated in the change summary,
        wherein a previous entry, for a deleted element deleted from the second version of the infrastructure model and indicated in the change summary, is maintained in the aggregated model version data.

2. The infrastructure modeling system of claim 1, wherein the change summary includes: (1) a change summary entry for each element that is inserted in the first version of the infrastructure model, (2) a change summary entry for each element that is updated in the first version of the infrastructure model, or (3) a change summary entry for each element that is deleted from the first version of the infrastructure model.

3. The infrastructure modeling system of claim 1, wherein the change summary is in a JavaScript Object Notation (JSON) format, Binary JSON (BSON) format, or Extensible Markup Language (XML) format.

4. The infrastructure modeling system of claim 1, wherein the one or more changesets are in a format that is compatible with a relational database.

5. The infrastructure modeling system of claim 1, wherein the processor further configured to:
    receive, from a client device, a request for modifications between two particular versions of the infrastructure model;
    obtain, based on the request, one or more change summaries associated with the two particular versions of the infrastructure model; and
    provide, to the client device via a graphical user interface or a command line interface, the modifications between the two particular versions of the infrastructure model utilizing information stored in the one or more change summaries.

6. The system of claim 1, wherein each entry in the aggregated model version data includes a version field indicating which particular versions of the infrastructure model a different element is included in.

7. The infrastructure modeling system of claim 6, wherein the processor is further configured to:
    receive, from a client device, a request for a requested version of the infrastructure model;
    determine, based on the request, which particular entries in the aggregated model version data, that correspond to particular elements, reference the requested version;
    provide, to the client device via a graphical user interface or a command line interface, the particular elements.

8. The infrastructure modeling system of claim 7, wherein the aggregated model version data is in a JavaScript Object Notation (JSON) format, Binary JSON (BSON) format, or Extensible Markup Language (XML) format.

9. A method, comprising:
    receiving from a repository a first briefcase representing a first version of an infrastructure model representing a real-world entity;
    receiving one or more changesets from the repository, wherein each changeset includes information associated with one or more changes made to the first briefcase;
    constructing, by a processor, a second briefcase representing a second version of the infrastructure model, wherein the first version of the infrastructure model and the second version of the infrastructure model are different;
    comparing, by the processor, the first briefcase and the second briefcase to determine one or more modifications between the first version and the second version of the infrastructure model;
    generating, by the processor, a change summary that stores information indicating the one or more modifications made to the infrastructure model between the first version and the second version of the infrastructure model that represents the real-world entity; and
    generating, utilizing the change summary, aggregated model version data that includes a plurality of aggregate model entries,
        wherein a particular aggregate model entry is generated (1) for each inserted model element that is inserted in the second version of the infrastructure model indicated in the change summary, and (2) for each updated model element that is updated in the second version of the infrastructure model and indicated in the change summary, wherein a previous entry, for a deleted element deleted from the second version of the infrastructure model and indicated in the change summary, is maintained in the aggregated model version data.

10. The method of claim 9, wherein the change summary includes: (1) a change summary entry for each element that is inserted in the first version of the infrastructure model, (2) a change summary entry for each element that is updated in the first version of the infrastructure model, and (3) a change summary entry for each element that is deleted from the first version of the infrastructure model.

11. The method of claim 9, wherein the change summary is in a JavaScript Object Notation (JSON) format, Binary JSON (BSON) format, or Extensible Markup Language (XML) format, and the one or more changesets are in a format that is compatible with a relational database.

12. The method of claim 9, further comprising:
receiving, from a client device, a request for modifications between two particular versions of the infrastructure model;
obtaining, based on the request, one or more change summaries associated with the two particular versions of the infrastructure model; and
providing, to the client device via a graphical user interface or a command line interface, the modifications between the two particular versions of the infrastructure model utilizing information stored in the one or more change summaries.

13. The method of claim 9, wherein each entry in the aggregated model version data includes a version field indicating which particular versions of the infrastructure model a different element is included in.

14. The method of claim 13, further comprising:
receiving, from a client device, a request for a requested version of the infrastructure model;
determine, based on the request, which particular entries in the aggregated model version data, that correspond to particular elements, reference the requested version;
provide, to the client device via a graphical user interface or a command line interface, the particular elements.

15. A non-transitory computer readable medium having software encoded thereon, the software when executed by one or more computing devices operable to:
receive from a repository a first briefcase representing a first version of an infrastructure model that represents a real-world entity;
receive one or more changesets from the repository, wherein each changeset includes information associated with one or more changes made to the first briefcase;
construct a second briefcase representing a second version of the infrastructure model, wherein the first version of the infrastructure model and the second version of the infrastructure model are different;
compare the first briefcase and the second briefcase to determine one or more modifications between the first version and the second version of the infrastructure model;
generate a change summary that stores information indicating the one or more modifications made to the infrastructure model between the first version and the second version of the infrastructure model that represents the real-world entity; and
generate, utilizing the change summary, aggregated model version data that includes a plurality of aggregate model entries,
wherein a particular aggregate model entry is generated (1) for each inserted model element that is inserted in the second version of the infrastructure model and indicated in the change summary, and (2) for each updated model element that is updated in the second version of the infrastructure model and indicated in the change summary,
wherein a previous entry, for a deleted element deleted from the second version of the infrastructure model and indicated in the change summary, is maintained in the aggregated model version data.

16. The non-transitory computer readable medium of claim 15, wherein the change summary includes: (1) a change summary entry for each element that is inserted in the first version of the infrastructure model, (2) a change summary entry for each element that is updated in the first version of the infrastructure model, and (3) a change summary entry for each element that is deleted from the first version of the infrastructure model.

17. The non-transitory computer readable medium of claim 15, wherein the software when executed further operable to:
receive, from a client device, a request for modifications between two particular versions of the infrastructure model;
obtain, based on the request, one or more change summaries associated with the two particular versions of the infrastructure model; and
provide, to the client device via a graphical user interface or a command line interface, the modifications between the two particular versions of the infrastructure model utilizing information stored in the one or more change summaries.

18. The infrastructure modeling system of claim 1, wherein the change summary includes a different field for each modification made to the infrastructure model between the first version and the second version.

* * * * *